Patented Feb. 23, 1937

2,071,459

UNITED STATES PATENT OFFICE 2,071,459

PROCESS OF PURIFYING POLYGLYCEROL ESTERS

Reginald Furness, Warrington, England, assignor to Lever Brothers Limited, Port Sunlight, England, a company of Great Britain No Drawing. Application August 20, 1935, Serial No. 37,041. In Great Britain September 4, 1934

3 Claims. (Cl. 87—12)

This invention relates to the process of purifying polyglycerol fatty-acid esters which contain unesterified hydroxyl groups and possess detergent and lathering properties.

As is known, when glycerol is heated with or without a catalyst under suitable conditions, condensation occurs and so-called polyglycerols are produced. By partial esterification of the polyglycerols with fatty acids the corresponding esters—i. e., esters containing unesterified hydroxyl groups—can be produced. Other methods of producing these esters are known; for example, by heating fats or oils (triglycerides) with glycerol in the presence or absence of a catalyst under suitable conditions, whereby condensation and esterification are effected in one operation.

Esters of this kind possessing detergent and lathering properties, when prepared from glycerol or polyglycerol and fatty acids or triglycerides (fats or oils) contain, in the crude state, more or less considerable proportions of unconverted glycerol and/or polyglycerol hereinafter termed "polyglycerol residue". It is the object of the invention to obtain from such crude products purified or concentrated polyglycerol esters substantially free from these impurities.

A further object of the invention is to recover the unconverted polyglycerol residue (i. e. glycerol and/or polyglycerol) separated from the crude material.

It has been found that the lathering and detergent properties of the crude polyglycerol esters are greatly improved by this process of purification or concentration.

Polyglycerol esters with detergent and lathering properties can be produced from various polyglycerols. For example, mono-, di-, and higher esters can be produced from tri-, tetra-, pentaand hexa-glycerol by esterification with fatty acids. For washing purposes it is preferable to produce mono fatty acid esters, but if polyglycerol and fatty acids, in proportions equivalent to the desired mono-ester, are heated together, the mono-ester is by no means exclusively formed. Even if only one-third or one-fifth of the calculated proportion of fatty acid be employed, higher esters than the mono-ester are still formed in appreciable proportion.

The invention is based on the discovery that a substantial separation of the polyglycerol ester from the polyglycerol residue (i. e. unconverted glycerol and/or polyglycerol) can be effected by a process of selective solution in an appropriate salt solution. It has been found that if the crude ester be mixed with a suitable aqueous salt solution as hereinafter defined, glycerol and polyglycerol pass into solution and when the mixture is allowed to stand practically the whole of the ester along with some of the salt solution separates and forms an upper layer which can readily be removed from the aqueous liquid. From the latter the glycerol or polyglycerol along with any dissolved ester may be recovered by evaporation—for example, in a manner similar to that adopted for glycerine recovery in soap manufacture—and may be used in the production of further quantities of the ester.

The invention consists in a process of producing purified or concentrated polyglycerol fattyacid esters which contain unesterified hydroxyl groups and possess detergent and lathering properties by mixing the crude esters containing polyglycerol residue with an aqueous solution of sodium sulphate, agitating the mixture to cause the polyglycerol residue to dissolve in the aqueous solution, and separating the latter from the undissolved ester.

The invention further consists in recovering from the crude ester the polyglycerol residue contained therein by evaporation of the aqueous solution separated from the undissolved ester.

The following are examples of esters which in their crude state may be treated according to the invention:

Triglycerol mono-ester of lauric acid.
Tri-tetraglycerol mono-ester of lauric acid.
Tetra-pentaglycerol mono-ester of lauric acid.
Tri-tetraglycerol mono and di-esters of lauric acid.
Tetra-pentaglycerol mono-ester of coconut oil fatty acids.
Tri-tetraglycerol or tetra-pentaglycerol mono and di-esters of palm kernel oil fatty acids.

Various salts may be employed for producing the aqueous solution required, although it is not every salt that will serve the purpose; some give good results with one crude ester but not with another. The sulphate of sodium, aluminium, magnesium and ammonium, and di-sodium phosphate, when used for example as 20 per cent. solutions, have been found to operate satisfactorily in the treatment of various crude esters, the best results having been obtained with solutions of sodium sulphate. Zinc sulphate, sodium dihydrogen phosphate, sodium metaphosphate, lithium sulphate, potassium sulphate, sodium thiosulphate and sodium sulphite have each given satisfactory results with certain crude esters.

The chlorides of sodium, potassium, ammonium, barium and calcium have been found unsatisfactory and are not suitable for the purposes of this invention.

The invention can be carried out at ordinary or increased temperature, but for practical purposes working in the heat is preferred, as in the cold larger proportions and higher concentrations of the separating salt solutions are required and separation into two layers is not so readily brought about as at higher temperatures.

Regarding the concentration of the salt solutions employed highly concentrated solutions are preferred for practical purposes, as the higher the concentration the less is in general the amount of salt solution required for effective separation.

The concentration of the sodium sulphate in the solution best suited for the purification of the crude ester depends to some extent upon the composition of the latter, but in general a concentration of about 20 parts by weight in 100 parts of hot water gives satisfactory results. The following is an example of the manner in which the invention may be carried out.

*Example*

The crude ester used in the process was made from 100 parts by weight of polyglycerol (corresponding in hydroxyl content approximately to that possessed by hexa-glycerol) and 10 parts by weight of coconut oil. It contained approximately 23% of esters and 77% of unesterified polyglycerol. The crude ester (100 parts by weight) was mixed with a solution of 40 parts of sodium sulphate ($Na_2SO_4$) in 200 parts of water; the mixture was stirred and heated to about 80°–100° C. and then allowed to stand, when separation into two definitely marked layers occurred. The upper layer, consisting of practically the whole of the esters contaminated with some polyglycerol and sodium sulphate solution, was removed from the aqueous under-layer. The upper layer was subjected to a further treatment with a fresh solution of 40 parts of sodium sulphate in 200 parts of water, when an upper layer consisting almost wholly of esters and about 30 per cent. of sodium sulphate solution was obtained and was run off for use. The first under-layer was evaporated until practically all the sodium sulphate had been thrown out of solution; the liquid portion consisting of a highly concentrated solution of recovered polyglycerol was filtered off and used for the production of a further quantity of ester.

When the crude ester is associated with a considerable quantity of water it may not be necessary to add the salt in solution to the crude ester but it may be sufficient to add the salt itself.

I claim:—

1. A process for producing purified or concentrated substantially water-soluble polygycerol fatty-acid esters which contain unesterified hydroxyl groups and possess detergent and lathering properties, comprising mixing crude esters containing polyglycerol residue with an aqueous solution of sodium sulphate, agitating the mixture to cause the polyglycerol residue to dissolve in the aqueous solution, and separating the latter from the undissolved ester.

2. A process for producing purified or concentrated substantially water-soluble polyglycerol fatty-acid esters which contain unesterified hydroxyl groups and possess detergent and lathering properties, comprising mixing crude esters containing polyglycerol residue with an aqueous solution of sodium sulphate, agitating the mixture to cause the polyglycerol residue to dissolve in the aqueous solution, separating the latter from the undissolved ester, and recovering the polyglycerol residue from the aqueous solution.

3. A process for producing purified or concentrated substantially water-soluble polyglycerol fatty-acid esters which contain unesterified hydroxyl groups and possess detergent and lathering properties, comprising mixing crude esters containing polyglycerol residue with an aqueous solution of sodium sulphate, maintaining the temperature at about 80° to 100° C. whilst agitating the mixture to cause the polyglycerol residue to dissolve in the aqueous solution, and separating the latter from the undissolved ester.

REGINALD FURNESS.